United States Patent
Kimata et al.

(10) Patent No.: US 12,069,208 B2
(45) Date of Patent: Aug. 20, 2024

(54) IMAGE FORMING APPARATUS, TYPE INFORMATION PROCESSING METHOD OF RECORDING MEDIUM, AND PROGRAM FOR IDENTIFYING A CAUSE OF FAILURE

(71) Applicant: Konica Minolta, Inc., Tokyo (JP)

(72) Inventors: Akinori Kimata, Toyokawa (JP); Takahiro Tsujimoto, Toyokawa (JP); Noriyuki Jinbo, Hamamatsu (JP); Kenichi Hayashi, Anjo (JP); Shiro Umeda, Toyokawa (JP); Satoru Sasaki, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 9 days.

(21) Appl. No.: 17/971,699

(22) Filed: Oct. 24, 2022

(65) Prior Publication Data

US 2023/0156127 A1 May 18, 2023

(30) Foreign Application Priority Data

Nov. 17, 2021 (JP) .................................. 2021-186991

(51) Int. Cl.
*H04N 1/00* (2006.01)
(52) U.S. Cl.
CPC ..... *H04N 1/00029* (2013.01); *H04N 1/00079* (2013.01); *H04N 1/00092* (2013.01); *H04N 1/00482* (2013.01)
(58) Field of Classification Search
None
See application file for complete search history.

(56) References Cited

U.S. PATENT DOCUMENTS

2019/0253575 A1* 8/2019 Wei ..................... H04N 1/00037
2020/0379688 A1* 12/2020 Sugiura ................. G06F 3/1253

FOREIGN PATENT DOCUMENTS

JP 2005-70877 A 3/2005
JP 2009-135923 A 6/2009
(Continued)

OTHER PUBLICATIONS

Japanese Office Action (JPOA) dated May 9, 2023 for Japanese Patent Application No. 2023-068311; English translation.
(Continued)

*Primary Examiner* — Andrew H Lam
(74) *Attorney, Agent, or Firm* — RANKIN, HILL & CLARK LLP (57) ABSTRACT

An image forming apparatus includes: a first hardware processor that receives setting of a type of a recording medium by a user; a detector that detects a type determination parameter for a recording medium including a recording medium for which setting of a type has been received by the first hardware processor; a second hardware processor that determines a type of a recording medium based on a detection result of the detector; an image former that forms an image on the recording medium; and a third hardware processor that transmits, to an external device, at least two pieces of information of information regarding the type received, information regarding the type determined by the second hardware processor, or information regarding matching or mismatching of the type received and the type determined with respect to the recording medium for which setting of a type has been received by the first hardware processor.

15 Claims, 8 Drawing Sheets

(56) References Cited

FOREIGN PATENT DOCUMENTS

| | | |
|---|---|---|
| JP | 2012-83707 A | 4/2012 |
| JP | 2018-106112 A | 7/2018 |
| JP | 2019-200292 A | 11/2019 |
| JP | 2019-200397 A | 11/2019 |
| JP | 2020-192716 A | 12/2020 |
| JP | 2021-53824 A | 4/2021 |

OTHER PUBLICATIONS

Japanese Office Action (JPOA) dated Jan. 10, 2023 for Japanese Patent Application No. 2022-181138 and its English translation.
Japanese Office Action (JPOA) dated Feb. 21, 2023 for JP2022-181138; English translation.

* cited by examiner

IMAGE FORMING APPARATUS, TYPE INFORMATION PROCESSING METHOD OF RECORDING MEDIUM, AND PROGRAM FOR IDENTIFYING A CAUSE OF FAILURE

The entire disclosure of Japanese patent Application No. 2021-186991, filed on Nov. 17, 2021, is incorporated herein by reference in its entirety.

BACKGROUND

Technological Field

The present invention relates to an image forming apparatus such as a copying machine, a printer, or a multifunctional digital multifunction composite machine called MFP, a processing method of type information indicating a type of a recording medium, and a program.

Description of the Related Art

As an image forming apparatus, there is known an apparatus in which a user sets a type of a recording medium such as a sheet on which an image is formed from an operation panel or the like, and on the basis of this setting, an image is formed under an image forming condition optimum for the recording medium.

Further, recently, an image forming apparatus that automatically determines the type of a recording medium using an optical sensor or the like has been provided.

In addition, Japanese Patent Application Laid-Open No. 2018-106112 discloses an image forming apparatus that detects a medium characteristic of a recording material conveyed to an image formation unit, and interrupts an image forming process in a case where a detected first medium characteristic of the recording material being conveyed is different from a second medium characteristic of the recording material at the time of previous image formation stored in a RAM and an image forming condition according to the first medium characteristic is different from an image forming condition according to the second medium characteristic, or further allows a user to input a medium characteristic by an input unit after the interruption, and resumes an image forming operation under an image forming condition according to the input medium characteristic.

However, the type of the recording medium input by the user is not necessarily correct, and in a case where the type does not match the type determined on the basis of the detection result of the sensor, an inappropriate image forming condition is set, and if image formation is forcibly performed under this image forming condition, there is a possibility that a failure such as what is called a jam or the like in which the recording medium is clogged on the conveyance path occurs. When such a failure occurs, a service engineer will respond as necessary, but it is unknown as to how the apparatus was used and thus a cause cannot be identified, and an improvement plan cannot be proposed. Accordingly, there is a need for a technique that contributes to identification of a cause of occurrence of the failure.

SUMMARY

The present invention has been made in view of such a technical background, and an object thereof is to provide an image forming apparatus, a processing method of type information of a recording medium, and a program capable of contributing to identification of a cause of a failure such as a jam.

To achieve the abovementioned object, according to an aspect of the present invention, an image forming apparatus reflecting one aspect of the present invention comprises: a first hardware processor that receives setting of a type of a recording medium by a user; a detector that detects a type determination parameter for a recording medium including a recording medium for which setting of a type has been received by the first hardware processor; a second hardware processor that determines a type of a recording medium on a basis of a detection result of the detector; an image former that forms an image on the recording medium; and a third hardware processor that transmits, to an external device, at least two pieces of information of information regarding the type received, information regarding the type determined by the second hardware processor, or information regarding matching or mismatching of the type received and the type determined with respect to the recording medium for which setting of a type has been received by the first hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
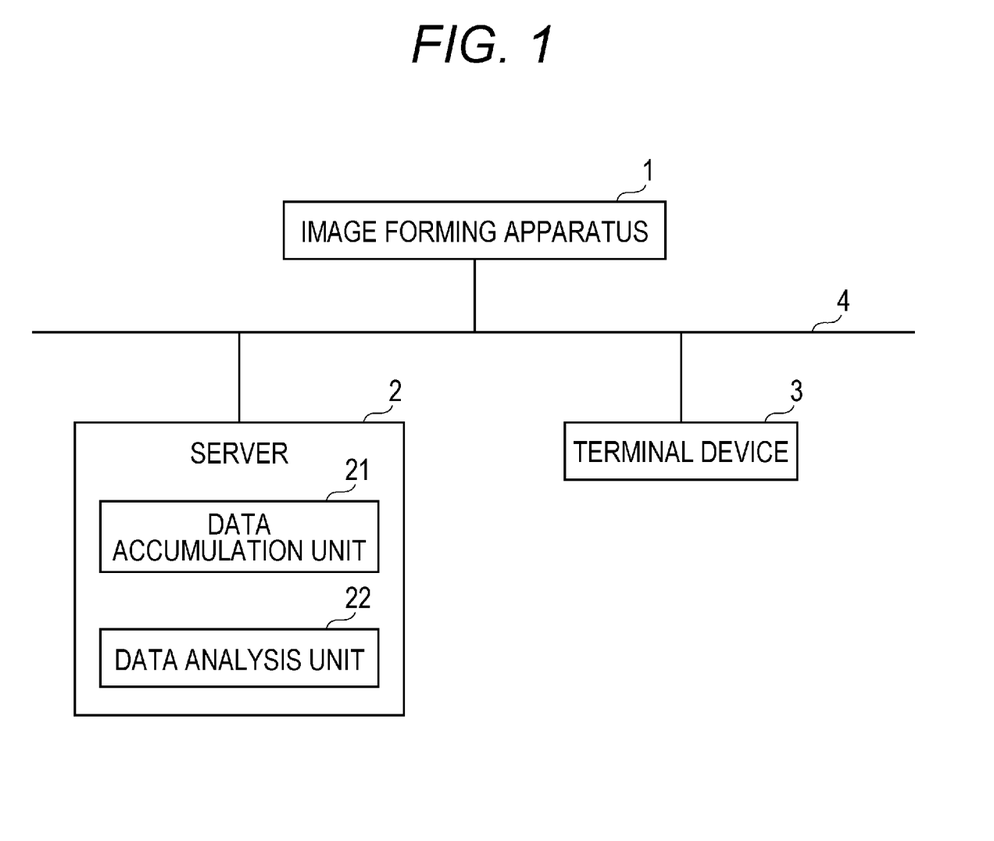
FIG. 1 is a configuration diagram of an information collection system using an image forming apparatus according to an embodiment of the present invention.

FIG. 1 is a configuration diagram of an information collection system using an image forming apparatus according to an embodiment of the present invention. In this information collection system, the image forming apparatus 1, the server 2, and the terminal device 3 are communicably connected to each other via a network 4 such as the Internet or a local area network (LAN).

The image forming apparatus 1 is not limited, but a copier, a printer, an MFP, or the like is used. In this embodiment, the image forming apparatus 1 has a user setting mode in which a user can set a type (also referred to as a sheet type or a paper type) of a recording medium (hereinafter, the recording medium is also referred to as sheet or paper) such as a sheet on which an image is printed, and an automatic detection mode in which the image forming apparatus automatically determines the sheet type without the user setting the sheet type.

As described later, the server 2 serves to acquire various types of information from the image forming apparatus 1 and accumulate the information in a data accumulation unit 21, analyze the accumulated data by a data analysis unit 22 as necessary, and further provide an analysis result to the image forming apparatus 1, and is constituted by a personal computer or the like. The server 2 may be a virtual server on a cloud, what is called a cloud server. Note that the server 2 may collect information not only from one image forming apparatus 1 but also from a plurality of image forming apparatuses 1.

The terminal device 3 is a personal computer, a tablet, a smartphone, or the like operated by the user, and in this embodiment, the terminal device 3 functions as an instruction unit that instructs the image forming apparatus 1 on a print job including setting of the sheet type by the user.

Figure 2:
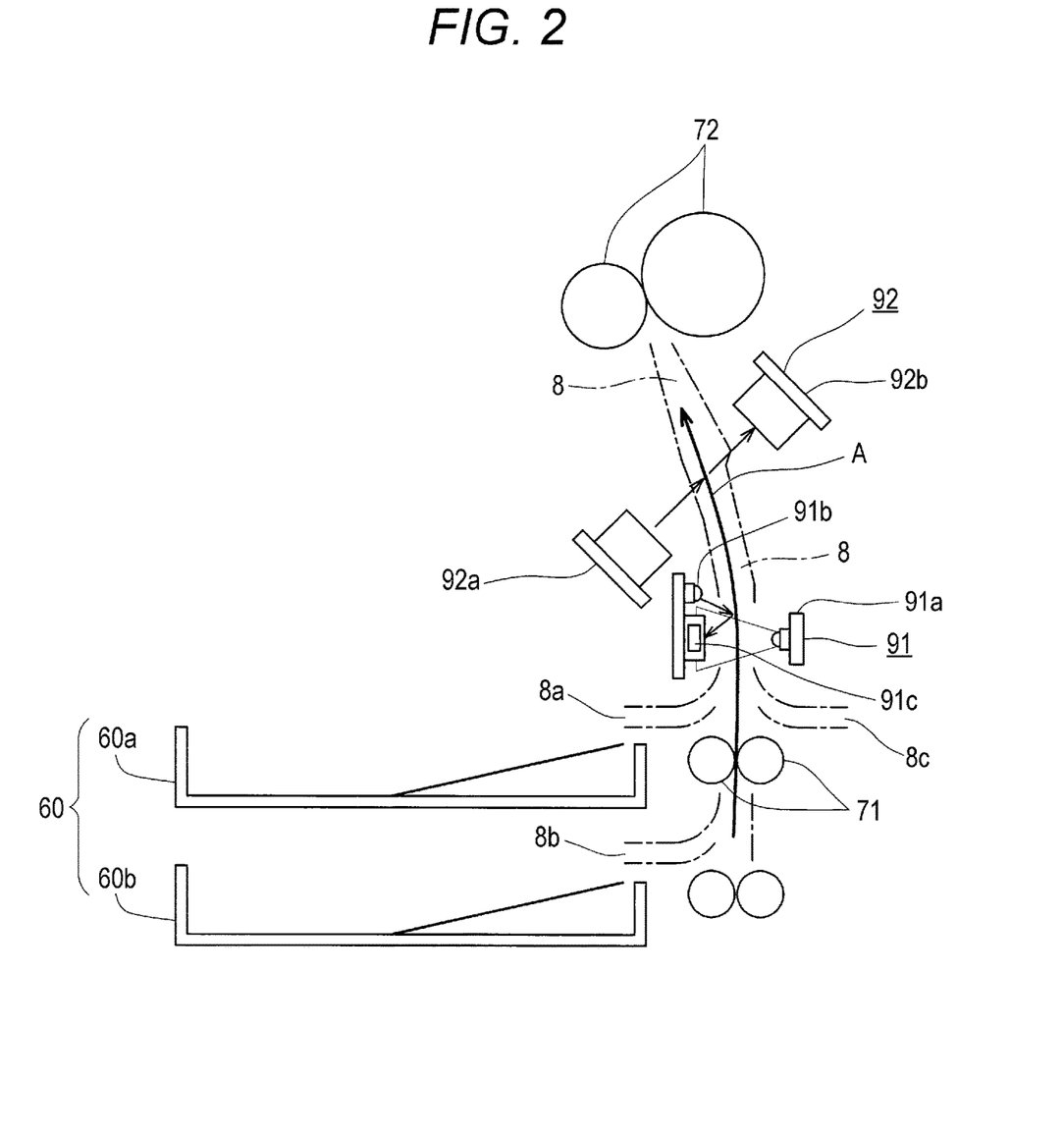
FIG. 2 is a view schematically illustrating a part of a conveyance path of a sheet on which an image is to be printed in the image forming apparatus.

FIG. 2 is a view schematically illustrating a part of a conveyance path of a sheet on which an image is printed in the image forming apparatus 1.

A sheet feeding unit 60 is provided in a lower portion of the image forming apparatus 1, and in the sheet feeding unit 60, a first stage sheet feeding cassette 60a at an upper stage and a second stage sheet feeding cassette 60b at a lower stage are disposed, and a sheet conveying path 8 is formed in a vertical direction in communication with a sheet feeding port 8a of the first stage sheet feeding cassette 60a and a sheet feeding port 8b of the second stage sheet feeding cassette 60b. Then, it is configured such that a sheet fed from the sheet feeding port 8a of the first stage sheet feeding cassette 60a or the sheet feeding port 8b of the second stage sheet feeding cassette 60b to the sheet conveying path 8 is conveyed upward in the sheet conveying path 8 as indicated by an arrow A to a pair of skew correction rollers 72 installed at an upper position of the sheet conveying path 8. In addition, a manual feeding tray (not illustrated) is provided on the opposite side of the first stage sheet feeding cassette 60a across the sheet conveying path 8, and sheets set in the manual feeding tray are fed to the sheet conveying path 8 via a manual feeding port 8c. Note that reference numeral 71 illustrated in FIG. 2 denotes a conveying roller for conveying a sheet fed from the second stage sheet feeding cassette 60b.

The skew correction rollers 72 are rollers for correcting skew (inclination) of the sheet conveyed through the sheet conveying path 8.

Between the sheet feeding port 8a of the upper first stage sheet feeding cassette 60a and the skew correction rollers 72, two medium detection sensors 91 and 92 are disposed on the upstream side and the downstream side in a conveyance direction on the sheet conveying path 8. The medium detection sensors 91 and 92 detect a type determination parameter for a sheet, the medium detection sensor 91 on the upstream side is an optical sensor that detects light radiated to the sheet as the type determination parameter, and the medium detection sensor 92 on the downstream side is an ultrasonic sensor that detects an ultrasonic wave output toward the sheet as the type determination parameter. Note that the optical sensor 91 may be disposed on the upstream side, and the ultrasonic sensor 92 may be disposed on the downstream side.

Figure 3:
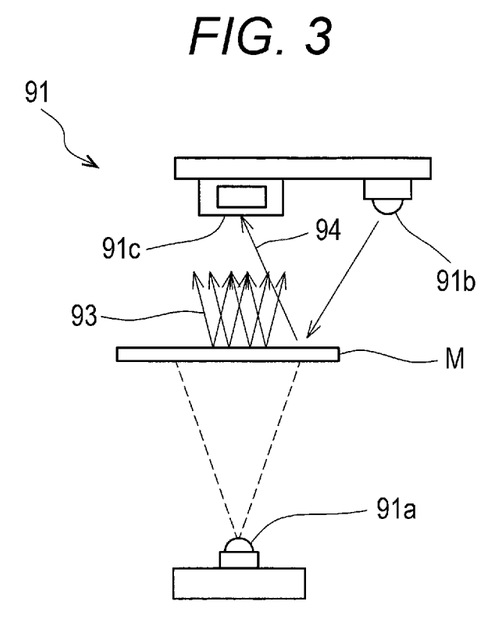
FIG. 3 is an explanatory view of an optical sensor.

FIG. 3 is an explanatory view of the optical sensor 91. The optical sensor 91 includes a transmission light source 91a such as an LED and a reflection light source 91b, and a light receiving element 91c including a photodiode or the like, in which the light receiving element 91c detects the amount of transmitted light 93 of light emitted from the transmission light source 91a and passing through the sheet conveyed through the sheet conveying path 8 and the amount of reflected light 94 of light emitted from the reflection light source 91b and reflected by the sheet. Then, on the basis of the detected levels of the amount of transmitted light and the amount of reflected light, the control unit 100 to be described later determines the type of sheet (basis weight, OHP, recycled paper, coated paper, or the like). Note that the optical sensor 91 may include, for example, a plurality of sensor groups corresponding to each color of red, green, and blue.

Figure 4:
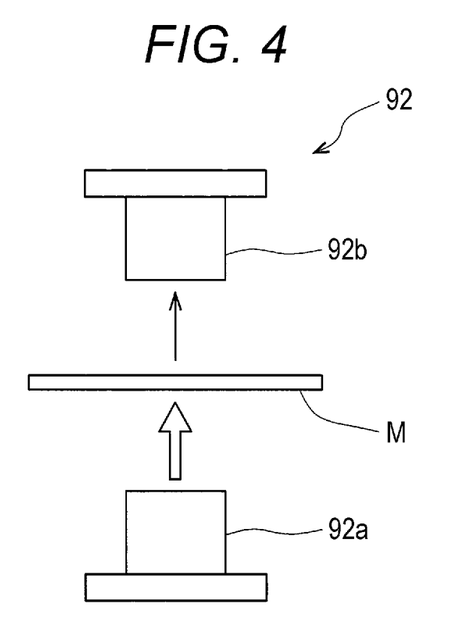
FIG. 4 is an explanatory view of an ultrasonic sensor.

FIG. 4 is an explanatory view of the ultrasonic sensor 92. The ultrasonic sensor 92 includes a pair of an ultrasonic transmitter 92a and an ultrasonic receiver 92b that are disposed obliquely facing each other across the sheet conveying path 8 with respect to a sheet passage direction (see FIG. 2). The ultrasonic sensor 92 transmits the ultrasonic wave from the ultrasonic transmitter 92a to the passing sheet, and the ultrasonic receiver 92b receives the ultrasonic wave transmitted through the sheet. Then, the control unit 100 described later determines whether the sheet is a single sheet or an envelope on the basis of the attenuation amount of the ultrasonic wave by the sheet.

Figure 5:
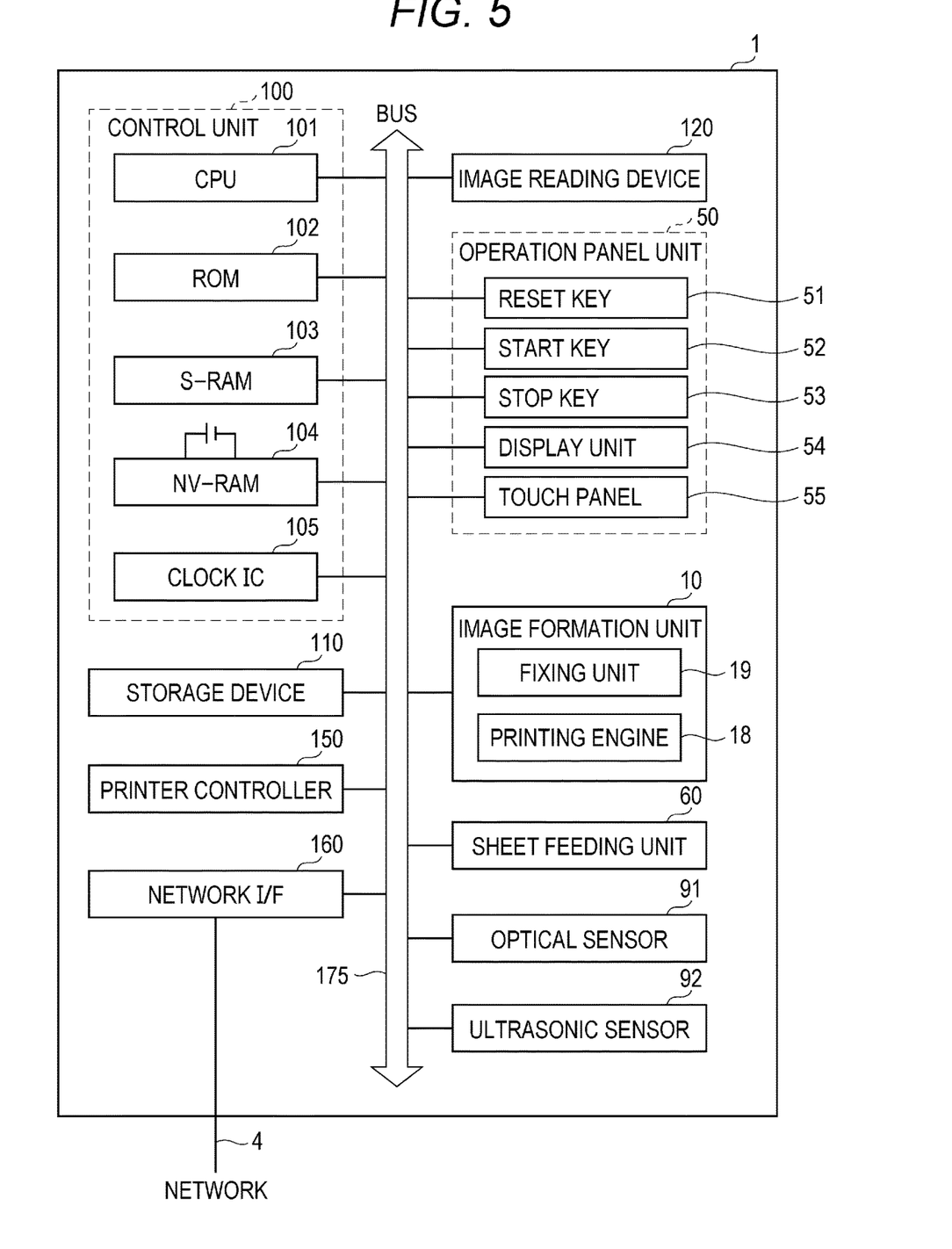
FIG. 5 is a block diagram illustrating an electrical configuration of the image forming apparatus.

FIG. 5 is a block diagram illustrating an electrical configuration of the image forming apparatus 1. As illustrated in FIG. 5, the image forming apparatus 1 includes a control unit 100, a storage device 110, an image reading device 120, an operation panel unit 50, an image formation unit 10, the sheet feeding unit 60, and the optical sensor 91 and an ultrasonic sensor 92 described above, and further includes a printer controller 150, a network interface (network I/F) 160, and the like, which are connected to each other via a system bus 175.

The control unit 100 includes a central processing unit (CPU) 101, a read only memory (ROM) 102, a static random access memory (S-RAM) 103, a non-volatile RAM (NV-RAM) 104, a clock IC 105, and the like.

The CPU 101 executes an operation program stored in the ROM 102 or the like to integrally control the entire image forming apparatus 1. For example, in addition to performing control such that a copy function, a printer function, a scan function, and the like are executable, particularly in this embodiment, in the automatic detection mode described above, light quantity detection by the optical sensor 91 and ultrasonic detection by the ultrasonic sensor 92 are executed, a sheet type is determined on the basis of a detection result, and printing is executed by automatically setting an image forming condition corresponding to the sheet type on the basis of the sheet type determination result at the time of printing. Furthermore, in the user setting mode, setting of a print job including setting of a sheet type performed by the user operating the operation panel unit 50 or performed from the terminal device 3 via the network 4 is received, and printing is executed by setting the image forming condition corresponding to the received sheet type. Furthermore, in the present embodiment, the light amount detection by the optical sensor 91 and the ultrasonic detection by the ultrasonic sensor 92 are also executed for the sheet for which the sheet type is set by the user in the user setting mode, and the sheet type is determined on the basis of the detection result. Then, control processing such as checking whether the received sheet type and the determined sheet type match or mismatch and transmitting necessary information including the result to the server 2 is executed, and details thereof will be described later.

The ROM 102 stores programs executed by the CPU 101 and other data.

The S-RAM 103 serves as a work area when the CPU 101 executes a program, and temporarily stores the program, data when executing the program, and the like.

The NV-RAM 104 is a nonvolatile memory backed up by a battery, and stores various settings related to image formation, the number of pixels of the display unit 54, data of various screens displayed on the display unit 54, and the like.

The clock IC 105 measures time, functions as an internal timer, and measures a processing time.

The storage device 110 includes a hard disk or the like, and stores programs, various data, and the like.

The image reading device 120 includes a scanner and the like, reads a document set on a platen glass by scanning the document, and converts the read document into image data.

The operation panel unit 50 is used when a user instructs the image forming apparatus 1 on a job or the like or performs various settings, and includes a reset key 51, a start key 52, a stop key 53, a display unit 54, a touch panel 55, and the like.

The reset key 51 is used when resetting the setting, the start key 52 is used for a start operation such as scanning, and the stop key 53 is pressed when interrupting the operation or the like.

The display unit 54 includes, for example, a liquid crystal display device and displays a message, various operation screens, and the like, and the touch panel 55 is formed on a screen of the display unit 54 and detects a touch operation of the user.

The image formation unit 10 prints a copy image generated from image data of a document read by the image reading device 120 or print data transmitted from an external terminal device 3 or the like on a sheet, and includes a printing engine 18 including hardware components for image formation such as a photosensitive drum, a charging device, an exposure device, a developing device, a transfer belt, and transfer rollers, a fixing unit 19 that fixes an image by heating and pressurizing a sheet on which an image has been formed, and the like.

The network I/F 160 functions as a communication unit that transmits and receives data to and from an external server 2, a terminal device 3, or the like via the network 4.

Figure 6:
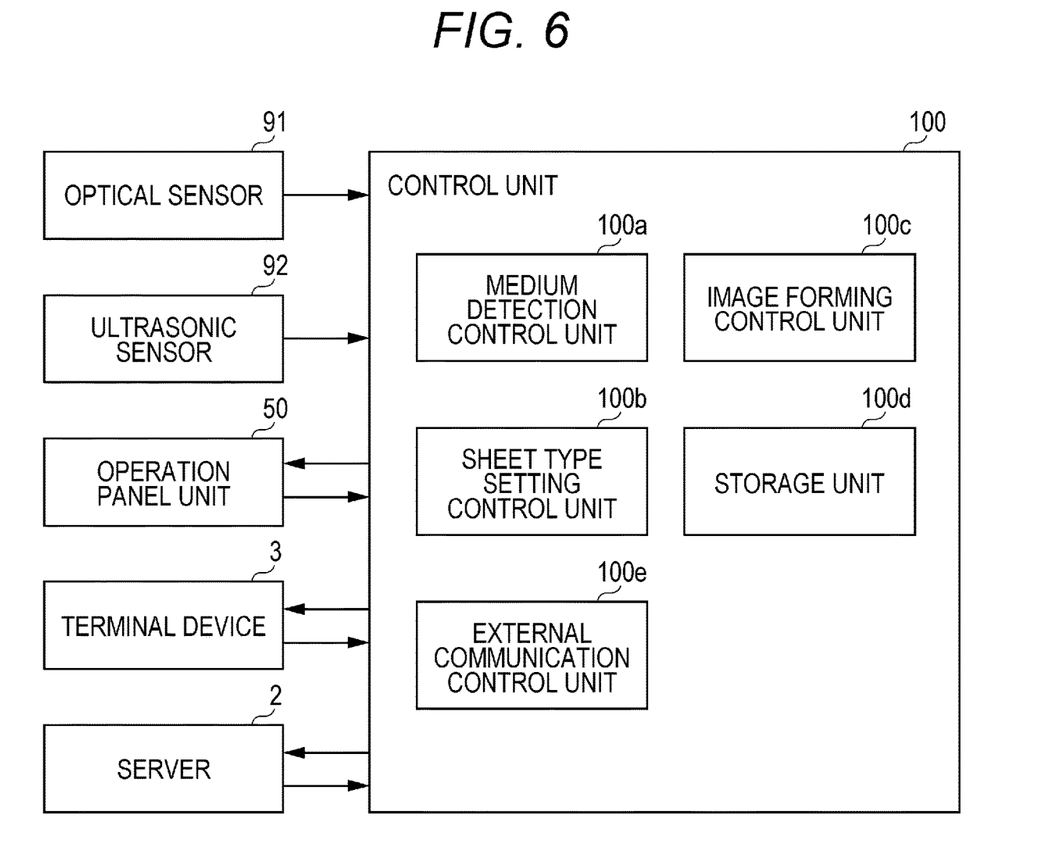
FIG. 6 is a block diagram for explaining a functional configuration of a control unit of the image forming apparatus.

FIG. 6 is a block diagram for explaining a functional configuration of the control unit 100. The control unit 100 functionally includes a medium detection control unit 100a, a sheet type setting control unit 100b, an image forming control unit 100c, a storage unit 100d, and an external communication control unit 100e.

The sheet type setting control unit 100b receives the sheet type set by the user in the print job from the operation panel unit 50 or the terminal device 3 in the user setting mode.

The medium detection control unit 100a operates the optical sensor 91 and the ultrasonic sensor 92, which are medium detection sensors, and determines the sheet type on the basis of the detection result. As described above, not only in the automatic detection mode, but also in a case where the user sets the sheet type in the user setting mode, the optical sensor 91 and the ultrasonic sensor 92 are operated to determine the sheet type on the basis of the detection result.

The image forming control unit 100c controls the image formation unit 10 under the image forming condition corresponding to each sheet type on the basis of the sheet type set by the user received by the sheet type setting control unit 100b in the user setting mode and on the basis of the sheet type determined by the medium detection control unit 100a in the automatic detection mode, and prints an image on the sheet.

The storage unit 100d stores the sheet type set by the user and the sheet type determined by the medium detection control unit 100a.

The external communication control unit 100e corresponds to the network I/F 160 of FIG. 2, and transmits, to the server 2, information regarding the sheet type set by the user in the user setting mode and stored in the storage unit 100d. Furthermore, information regarding the sheet type automatically determined by the medium detection control unit 100a with respect to the sheet for which the user has set the sheet type and the sheet for which the user has not set the sheet type is transmitted to the server 2.

On the basis of the received information, the server 2 determines whether the received sheet type matches or does not match the determined sheet type.

Alternatively, the sheet type setting control unit 100b may determine matching or mismatching between the received sheet type and the automatically determined sheet type for the sheet for which the user has set the sheet type, and the external communication control unit 100e may transmit the information regarding matching or mismatching to the server 2 together with one of the information regarding the received sheet type and the information regarding the automatically determined sheet type. Alternatively, all of the information regarding the received sheet type, the information regarding the automatically determined sheet type, and the information regarding matching or mismatching may be transmitted to the server 2.

At the time of transmission, each piece of information to be transmitted is transmitted in association with each other by a method such as attaching the same ID. Thus, the server 2 can store and accumulate each piece of received information in association with each other.

Information is transmitted from the image forming apparatus 1 to the server 2 via the network 4, but the image forming apparatus 1 may have a USB connection function and may transmit the information to the server 2 including a management personal computer or the like connected to the image forming apparatus 1 via the USB.

Next, the operation of the image forming apparatus 1 will be described focusing on control by the control unit 100.

The user operates the operation panel unit 50 to give an instruction on a print job, or gives an instruction on a print job from the terminal device 3 to the image forming apparatus 1. In the user setting mode, the user can set the type (sheet type) of a sheet on which an image is formed when giving an instruction on a print job. The print job including the setting of the sheet type is received by the control unit 100. In a case where an instruction of a print job including the setting of the sheet type is issued by the terminal device 3, the print job is transmitted to the image forming apparatus 1 via the network 4 and received by the control unit 100 of the image forming apparatus 1. As a scene where the user sets the sheet type and performs printing (image formation), for example, there is a case where the user sets thick sheet as plain sheet in order to improve productivity.

Upon receiving the print job, the control unit 100 of the image forming apparatus 1 feeds a sheet from the first stage sheet feeding cassette 90a or the second stage sheet feeding cassette 90b to the sheet conveying path 8, and conveys the fed sheet toward the skew correction rollers 72.

The control unit 100 causes the optical sensor 91 and the ultrasonic sensor 92 to detect a sheet type determination parameter during conveyance of the conveyed sheet. Specifically, the light receiving element 91c receives transmitted light and/or reflected light of light emitted from the light sources 91a and 91b of the optical sensor 91 to the sheet. In addition, an ultrasonic wave transmitted from the ultrasonic transmitter 92a of the ultrasonic sensor 92 is received by the ultrasonic receiver 92b.

The control unit 100 determines the type of the sheet on the basis of the amount of light received by the light receiving sensor 91c in the optical sensor 91 and the amount received by the ultrasonic receiver 92b in the ultrasonic sensor 92.

The detection of the sheet type determination parameter by the optical sensor 91 and the ultrasonic sensor 92 and the determination of the sheet type based on a detection result are performed for both the sheet for which the user has not set the sheet type and the sheet for which the user has set the sheet type.

In this embodiment, the detection of the sheet type determination parameter by the optical sensor 91 and the ultrasonic sensor 92 is performed in a first detection mode in the automatic detection mode in which the user does not set the sheet type, and is performed in a second detection mode different from the first detection mode in the user setting mode. In the automatic detection mode, the sheet type is determined on the basis of a detection result of the first detection mode, and printing is performed on the sheet under the image forming condition corresponding to the determined sheet type. On the other hand, in the user setting mode, the sheet type is determined on the basis of the detection result of the second detection mode, but the image forming condition corresponding to the sheet type set by the user is applied as the image forming condition, and printing on the sheet is performed under this image forming condition. Therefore, printing is performed without reflecting the detection results of the optical sensor 91 and the ultrasonic sensor 92.

In the first detection mode, since the sheet type is unknown, the sheet conveyance speed is reduced so that any sheet can be conveyed. Specifically, as illustrated in FIG. 2, by performing the detection while the sheet reaches the skew correction rollers 72 after reaching the medium detection sensors 91 and 92, the image is formed under the condition corresponding to the automatically determined sheet type without reducing productivity as much as possible.

On the other hand, in the second detection mode, the conveyance speed is set according to the sheet type set by the user. Thus, since the conveyance speed becomes faster than in the first detection mode depending on the sheet type, the time from when the sheet reaches each of the medium detection sensors 91 and 92 to when the sheet reaches the skew correction rollers 72 becomes short, and thus the detection time also becomes short.

For example, assuming that a range in which the detection result is stable during time from when the sheet reaches the medium detection sensors 91 and 92 and thereafter reaches the skew correction rollers 72 is 25 mm as a medium detection range, a sheet conveyance speed in the first detection mode is 150 mm/s, and a sheet conveyance speed in the second detection mode is 150 mm/s to 400 mm/s, the first detection time is 25 mm÷150 mm/s≈167 ms, and the second detection time is 25 mm÷400 mm/s≈63 ms at the minimum.

The detection of the sheet type determination parameter by each of the medium detection sensors 91 and 92 is performed by sampling a plurality of times. This sampling is executed in the processing capability and control requirement of the CPU 100a, and in the second detection mode, the number of data samples is smaller than in the first detection mode, and the detection accuracy may be deteriorated. Conversely, the first detection mode has higher detection accuracy than the second detection mode.

However, in the second detection mode, the sheet type determination parameter is detected in a range different from the first detection mode, and the detection time and the detection accuracy can be made equal to or higher than in the first detection mode. Specifically, even when the leading end of the sheet is conveyed beyond the skew correction rollers 72, the detection range (detection length) can be expanded by performing the detection, and accordingly, the detection range of the second detection mode is wider than the detection range of the first detection mode, and the detection time and the detection accuracy of the second detection mode can be equal to or higher than those of the first detection mode. In the second detection mode, since the automatically determined sheet type is not reflected in the image forming process, there is no influence on productivity.

In the automatic detection mode in which the user does not set the sheet type, the medium detection control unit 100a causes the detection in the first detection mode to be executed, and determines the sheet type on the basis of the detection result, and the image forming control unit 100c controls the image formation unit 10 to print an image on the sheet under the image forming condition corresponding to the determined sheet type. In addition, the external communication control unit 100e transmits information regarding the determined sheet type to the server 2.

On the other hand, in the user setting mode, the sheet type setting control unit 100b receives the sheet type set by the user, and the image forming control unit 100c controls the image formation unit 10 under the image forming condition corresponding to the received sheet type to print an image on the sheet. Further, the medium detection control unit 100a causes the medium detection sensors 91 and 92 to execute detection in the second detection mode, and determines the sheet type on the basis of the detection results. The external communication control unit 100e transmits, to the server 2, at least two pieces of information among information regarding the determined sheet type, information regarding the sheet type set by the user and received by the image forming apparatus, or information regarding matching or mismatching between the received sheet type and the determined sheet type.

Note that the transmission of the information to the server 2 may be performed every time the print job ends, may be performed for each of a plurality of jobs, may be performed at a predetermined time, and is not limited.

Figure 7:
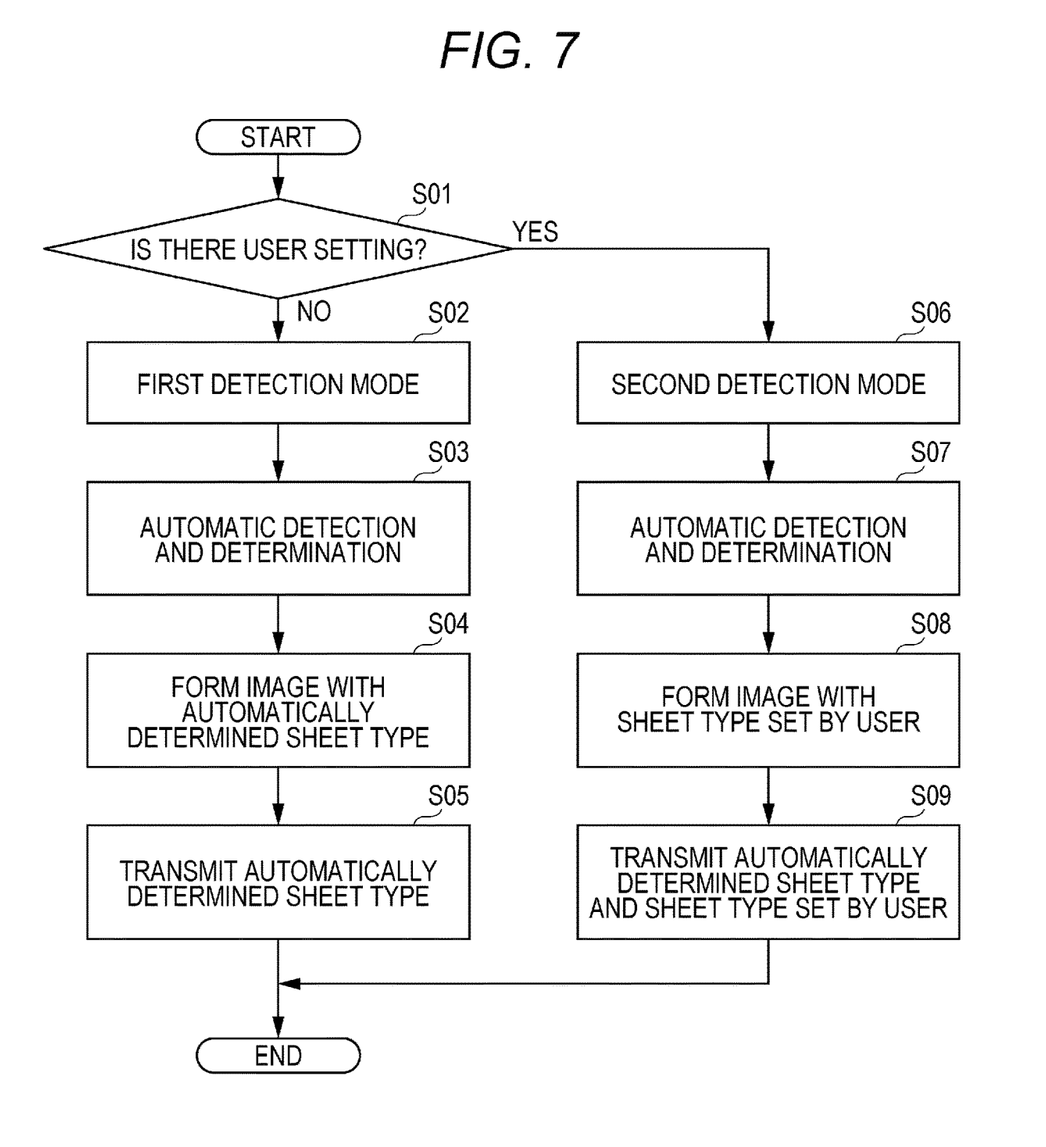
FIG. 7 is a flowchart illustrating an operation of the image forming apparatus when information to be transmitted is transmitted to a server.

FIG. 7 is a flowchart illustrating an operation of the image forming apparatus 1 when transmitting information to be transmitted to the server 2. This operation is executed by the CPU 101a of the control unit 100 of the image forming apparatus operating according to an operation program stored in the ROM 101b or the like.

In step S01, it is checked whether there is setting of the sheet type by the user (whether the setting has been received). When there is no setting of the sheet type ("NO"

in step S01), the first detection mode is applied in step S02, and automatic detection and determination of the sheet type is performed in step S03.

Next, in step S04, image formation is performed under the image forming condition corresponding to the automatically detected and determined sheet type, and then, in step S05, information including the automatically detected and determined sheet type is transmitted to the server 2.

On the other hand, when the sheet type is set by the user in step S01 ("YES" in step S01), the second detection mode is applied in step S06, and the automatic detection and determination of the sheet type is performed in step S07.

Next, in step S08, after the image formation is performed under the image forming condition corresponding to the sheet type set by the user, in step S09, information regarding the automatically detected and determined sheet type and information regarding the sheet type set by the user and received by the image forming apparatus are transmitted. Note that, information regarding matching or mismatching between the received sheet type and the automatically detected and determined sheet type may also be transmitted, or the information regarding matching or mismatching may be transmitted in place of either the information regarding the automatically detected and determined sheet type or the information regarding the received sheet type.

Table 1 illustrates an example of information transmitted from the image forming apparatus 1 to the server 2 in the automatic detection mode in which the sheet type is not set by the user.

TABLE 1

| Automatic detection mode | |
|---|---|
| Transmission date and time | 2021 Jun. 3 23:55 |
| Detection ID | ID155 |
| Detection date and time | 2021 Jun. 3 23:55 |
| Machine information | FORE010230099 |
| Medium detected sheet type | Thick sheet 2 |
| Number of passed sheets at time of detection ID | 485 |
| Failure information at time of detection ID | (None) |

The information in Table 1 is generated for each print job, and "transmission date and time" in the table is the date and time when the information is transmitted to the server, and the "detection ID" is identification information corresponding to the print job for which the sheet type has been detected and determined. "Detection date and time" is a date and time when the sheet type was detected and determined, "machine information" is identification information given to the image forming apparatus 1, and "medium detected sheet type" is information indicating the automatically detected and determined sheet type. In this embodiment, the automatic detection and determination of the sheet type is performed only for one sheet, for example, the first sheet of the print job, or the like. "Number of passed sheets at time of detection ID" indicates the number of printed sheets in the job, and "failure information at time of detection ID" indicates the presence or absence of a failure such as a jam during execution of the print job, and indicates that no failure has occurred in this example.

Table 1 illustrates an example of information transmitted from the image forming apparatus 1 to the server 2 in a case where the automatic detection and determination by the medium detection sensors 91 and 92 are not performed in the user setting mode.

TABLE 2

| User setting mode (without automatic detection) | |
|---|---|
| Transmission date and time | 2021 Jun. 3 23:55 |
| Machine information | FORE010112321 |
| User set sheet type | Thick sheet 2 |
| Number of passed sheets for each setting sheet type | 23 |
| Failure information for each setting sheet type | Fixing jam |

In Table 2, in addition to the "transmission date and time" and the "machine information" in Table 1, "user set sheet type", "number of passed sheets for each setting sheet type", and "failure information for each setting sheet type" are transmitted. In this example, it is indicated that the user has set a thick sheet 2 and a fixing jam has occurred during printing.

Table 3 illustrates a first example of information transmitted from the image forming apparatus 1 to the server 2 in a case where the automatic detection and determination are performed by the medium detection sensors 91 and 92 in the user setting mode.

TABLE 3

| User setting mode (with automatic detection) First Example | |
|---|---|
| Transmission date and time | 2021 Jun. 3 23:55 |
| Detection ID | ID321 |
| Detection date and time | 2021 Jun. 3 13:10 |
| Machine information | FORE010230099 |
| Medium detected sheet type | Thin sheet |
| Number of passed sheets at time of detection ID | 21 |
| Failure information at time of detection ID | Fixing jam |
| User set sheet type | Thick sheet 2 |

The information in Table 3 is generated for each print job. In addition to the "transmission date and time", the "detection ID", the "detection date and time", the "machine information", the "medium detected sheet type", the "number of passed sheets at time of detection ID", and the "failure information at time of detection ID", which are information similar to those in Table 1, "user set sheet type" indicating the sheet type set by the user is transmitted. In this example, it can be seen that although the user has set the thick sheet 2 as the sheet type, the sheet type determined on the basis of the medium detection sensors 91 and 92 is thin sheet, and the sheet types are different from each other. In addition, it is indicated that a failure of a fixing jam occurs during a print job. Note that the failure is not limited to the jam, and even in the case of the jam, it is possible to indicate that the jam is at a portion other than the fixing unit 19, for example, at the finisher.

Table 4 illustrates a second example of information transmitted from the image forming apparatus 1 to the server 2 when the automatic detection and determination are performed by the medium detection sensors 91 and 92 in the user setting mode.

TABLE 4

| User setting mode (with automatic detection) Second Example | |
|---|---|
| Transmission date and time | 2021 Jun. 3 23:55 |
| Detection ID | ID321 |
| Detection date and time | 2021 Jun. 3 13:10 |
| Machine information | FORE010230099 |
| Medium detected sheet type | Thin sheet |
| Number of passed sheets at time of detection ID | 21 |

TABLE 4-continued

User setting mode (with automatic detection)
Second Example

| | |
|---|---|
| Failure information at time of detection ID | Fixing jam |
| Relationship with user set sheet type | Mismatch |

In the example of Table 4, instead of the "user set sheet type" in Table 3, information regarding the "relationship with user set sheet type" is transmitted. The "relationship with user set sheet type" is information regarding matching or mismatching between the sheet type set by the user and a sheet type determination result (thin sheet in this example) by the medium detection sensor, and indicates mismatching. Note that both "user set sheet type" in Table 3 and "relationship with user set sheet type" in Table 4 may be transmitted.

Table 5 illustrates a third example of information transmitted from the image forming apparatus 1 to the server 2 in a case where the automatic detection and determination are performed by the medium detection sensors 91 and 92 in the user setting mode.

TABLE 5

User setting mode (with automatic detection)
Third Example

| | |
|---|---|
| Transmission date and time | 2021 Jun. 3 23:55 |
| Detection ID | ID321 |
| Detection date and time | 2021 Jun. 3 13:10 |
| Machine information | FORE010230099 |
| Medium detected sheet type | Thin sheet |
| Number of passed sheets at time of detection ID | 21 |
| Failure information at time of detection ID | Fixing jam |
| Relationship with user set sheet type | −4 rank |

In the example of Table 4, for the "relationship with user set sheet type", matching or mismatching between the sheet type set by the user and the determination results of the sheet type by the medium detection sensors 91 and 92 is directly indicated, but in the example of Table 5, a difference in basis weight level is indicated as sheet type information. That is, in a case where a thick sheet 1 is ranked −1, a plain sheet+ is ranked −2, a plain sheet is ranked −3, and a thin sheet is ranked −4 on a lower side of the basis weight category on the basis of the thick sheet 2, when the sheet type set by the user is the thick sheet 2, the thick sheet 2 and the thin sheet, which is the sheet type automatically detected and determined, are different by −4 ranks in the basis weight category, and thus are displayed as −4 rank. Note that the "user set sheet type" in Table 3 may also be transmitted.

In the examples of Tables 3 to 5, a combination of the "medium detected sheet type" and the "user set sheet type" or a combination of the "medium detected sheet type" and the "relationship with user set sheet type" is transmitted to the server 2. However, as described above, a combination of the "user set sheet type" and the "relationship with user set sheet type" may be transmitted, or it is sufficient if at least two pieces of information among the "medium detected sheet type", the "user set sheet type", or the "relationship with user set sheet type" are transmitted.

In addition, since each piece of information is attached with a detection ID, the pieces of information are transmitted in association with each other via the detection ID, and even if the pieces of information are separately transmitted, the server 2 can handle the pieces of information in association with each other on the basis of the same detection ID.

The server 2 receives information transmitted from the image forming apparatus 1, accumulates the information in the data accumulation unit 21, and analyzes the information in the data analysis unit 22 as necessary.

Figure 8:
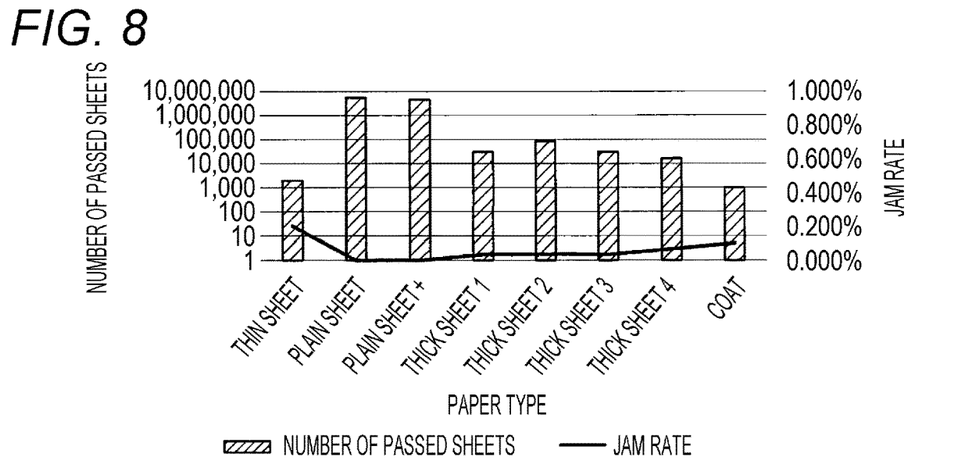
FIG. 8 is a graph illustrating an example of an analysis result by a server.

FIG. 8 illustrates an analysis result by the server 2, and is a graph illustrating the number of passed sheets and a jam rate for each sheet type in a certain period when printing is performed under the image forming condition corresponding to the sheet type determined on the basis of the detection results by the medium detection sensors 91 and 92. The bar graph indicates the number of passed sheets for each sheet type automatically detected, and the line graph indicates the ratio of the number of jams to the number of passed sheets (jam rate). This analysis is performed on the basis of the medium detected sheet type and the failure information (jam count) included in the data (Table 1) transmitted to the server 2 when the image forming apparatus 1 installed in the market operates in the automatic detection mode. It can be seen from FIG. 8 that the occurrence frequency of the jam is low.

Figure 9:
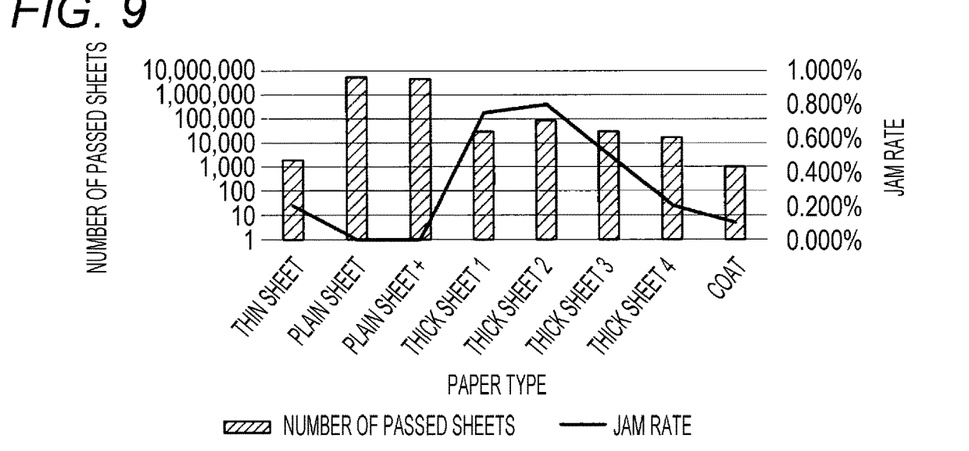
FIG. 9 is a graph illustrating another example of the analysis result by the server.

Next, FIG. 9 illustrates the number of passed sheets and the jam rate for each sheet type when printing is performed on the basis of the sheet type set by the user. This analysis is also performed by the server 2 on the basis of the user set sheet type and the failure information included in the data (Table 2) transmitted to the server 2 by the image forming apparatus 1 operating on the basis of the user setting. It can be seen from FIG. 9 that the frequency of occurrence of the jam is higher than in the case of FIG. 8. In particular, the jam rate of the thick sheet is larger than that of other sheet types.

Incidentally, the jam rate with respect to the total number of passed sheets in the automatic detection mode of FIG. 8 is 0.0070%, and the jam rate in the user setting mode of FIG. 9 is 0.0186%, which is larger than in the automatic detection mode. In addition, the user setting mode has a larger thick sheet passing ratio and a smaller thin sheet passing ratio than the automatic detection mode.

Figure 10:
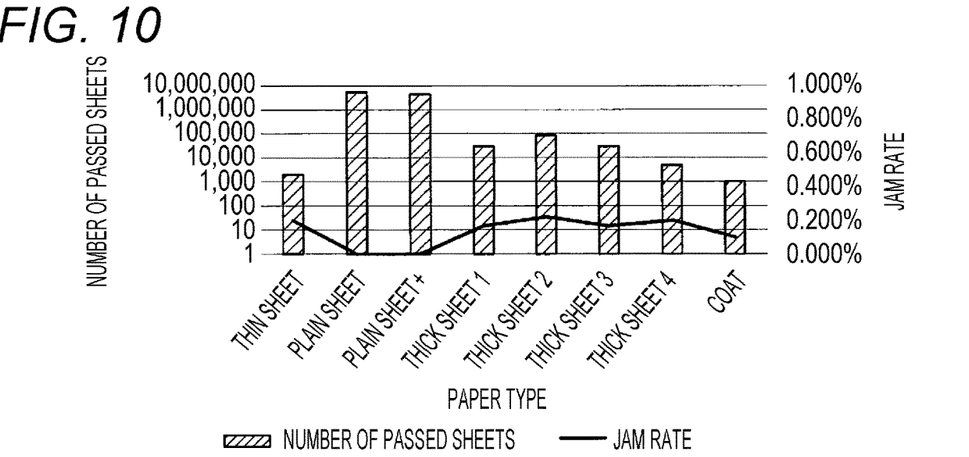
FIG. 10 is a graph illustrating still another example of the analysis result by the server.

FIG. 10 is a graph illustrating the number of passed sheets and the jam rate for each sheet type analyzed by the server 2 in a case where printing is performed on the basis of the sheet type set by the user and the automatic detection and determination of the sheet type by the medium detection sensors 91 and 92 is also performed (referred to as active detection in FIG. 10) in the user setting mode. The number of passed sheets in this case is the number of passed sheets in a case where the sheet type set by the user does not match among the number of passed sheets for each sheet type automatically detected and determined, and is a jam rate with respect to the number of passed sheets. This analysis is also performed on the basis of the medium detected sheet type, the user set sheet type or the relationship with the user set sheet type, and the failure information included in the data (Tables 3 to 5) transmitted to the server 2 by the image forming apparatus 1 that has performed printing on the basis of the user setting and has also automatically detected the sheet type. It can also be seen from FIG. 10 that the jam rate of the thick sheet or the thin sheet is larger than that of other sheet types.

As described above, in this embodiment, in the user setting mode, at least two pieces of information among the information regarding the sheet type set by the user and received by the image forming apparatus 1, the sheet type automatically detected and determined by the image forming apparatus 1, and the information regarding matching or mismatching between the sheet type set by the user and the sheet type automatically detected and determined are transmitted to the server 2, so that the server 2 can accumulate these pieces of information. In addition, by using the accumulated information, it is possible to analyze which sheet type has many user setting errors and the like to identify a cause of failure, and transmit the analysis result to the image forming apparatus 1 periodically, at an arbitrary timing, or in real time. The image forming apparatus 1 can receive the analysis result transmitted from the server 2 via the external communication control unit 100e, and at the time of printing or the like, the control unit 100 displays a message or the like based on an analysis result on the display unit 54 to prompt the user to confirm the setting of the appropriate sheet type. Thus, the occurrence of failures due to setting errors can be prevented.

Furthermore, when a failure such as a jam occurs, the image forming apparatus 1 also transmits specific failure information to the server 2, so that the server 2 can accumulate the user's setting mistake and the failure in association with each other and analyze accumulated data. For example, when a thick sheet is set by the user, the sheet type is determined as a thin sheet by the automatic detection and determination, and it is analyzed from the accumulated data that jams frequently occur as failure information, the analysis result is transmitted to the image forming apparatus 1 as failure occurrence information. In practice, when printing is performed on a thin sheet under an image forming condition corresponding to a thick sheet set by a user, the sheet is heated more than necessary, curling occurs, and a jam easily occurs in the fixing unit 19.

Figure 11:
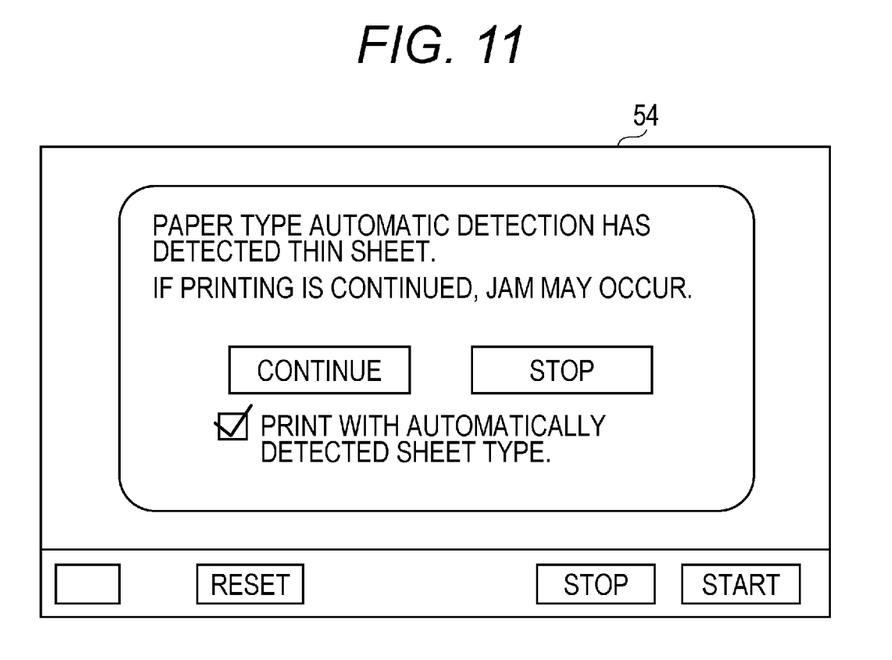
FIG. 11 is a diagram illustrating a screen display example for notifying a user that there is a possibility of occurrence of a failure.

When the sheet type automatically detected and determined is, for example, thin sheet and the sheet type set by the user is, for example, thick sheet, the image forming apparatus 1 that has received the failure occurrence information from the server 2 can notify the user of the possibility of occurrence of a jam on the display unit 54 as illustrated in FIG. 11. The user can select whether to continue or stop printing, and when continuing printing, the user can select whether to perform printing with the thick sheet set by the user or perform printing with the thin sheet automatically detected and determined according to the presence or absence of a check on the item "print with the automatically detected paper type".

Note that the notification to the user may be display on a screen of the terminal device 3 instead of the display on the display unit 54 of the image forming apparatus 1 illustrated in FIG. 11, may be notification by e-mail to an address registered in advance, or may be notification by voice.

In addition, the server 2 that has analyzed that there is a possibility of occurrence of a failure may instruct the image forming apparatus 1 to switch to the image forming condition corresponding to the automatically detected and determined sheet type. In this case, printing may be performed under the image forming condition of the sheet type on which an instruction is given without notifying the user, or the user may be notified that printing is performed by switching the image forming condition.

Further, the transmission of the analysis result from the server 2 to the image forming apparatus 1 may be performed not only to the image forming apparatus 1 in which the failure has occurred but also to a plurality of image forming apparatuses 1 connected to the same network 4.

Although one embodiment of the present invention has been described above, the present invention is not limited to the above embodiment.

For example, the information transmitted from the image forming apparatus 1 to the server 2 may include various types of information in addition to the information illustrated in Tables 3 to 5. For example, at least one of image information regarding the presence or absence of an image of the sheet surface, transmittance information of the sheet, reflectance information, rigidity information, thickness information, basis weight information, size information, grain direction information, color information, moisture information, smoothness information, resistance information, friction information, sheet configuration information, or print information may be included. The configuration information of the sheet includes at least one of pulp, a coat, a fluorescent agent, a filler, or a coloring material, and the print information includes at least one of a brand of sheet, environmental information, sheet feeding port information, or image forming information.

Table 6 sumimarizes these pieces of information for each detector to acquire them. For example, from the optical sensor 91, eachpiece ofUinfo ation ofthe sheettype, transmittance, and reflectance determined from the optical characteristics can be obtained. Information of sheet size can be obtained from the sheet feeding cassettes 90a and 90b, information ofrigidity canbe obtained from a sheet conveyance motor (mechanical mechanism), and information of sheet thickness can be obtained by measuring a displacement amount of a sheet conveyance roller with a displacement sensor, and information ofpaper grain direction, smoothness, and color canbe obtained from a sensor using CMOS. The "user selling" is information set by the user.

TABLE 6

| Detector | Optical sensor | Ultrasonic sensor | Mechanical mechanism and displacement sensor | Sheet restriction guide position sensor | CMOS sensor |
| --- | --- | --- | --- | --- | --- |
| Information to be transmitted | Sheet type Image information Transmittance Reflectance Basis weight Coating agent Fluorescent agent Filler Coloring material | Sheet type | Rigidity Thickness | Size | Grain direction Color Smoothness Friction Pulp |

TABLE 6-continued

| Detector | Electrostatic sensor | Transfer current monitor | Machine data | User setting |
|---|---|---|---|---|
| Information to be transmitted | Moisture | Resistance | Serial number<br>Detection date and time<br>Transmission date and time<br>Number of passed sheets<br>Failure information<br>Environment<br>Sheet feeding port | Brand of sheet<br>Sheet type<br><br>Image<br><br>Sheet size |

Further, the relationship between the sheet type and the basis weight is illustrated in Table 7.

TABLE 7

| Sheet type and basis weight | | |
|---|---|---|
| Sheet type | Basis weight lower limit | Basis weight upper limit |
| Thin sheet | 52 | 59 |
| Plain sheet | 60 | 90 |
| Plain sheet+ | 91 | 105 |
| Thick sheet 1 | 106 | 120 |
| Thick sheet 1+ | 121 | 157 |
| Thick sheet 2 | 158 | 209 |
| Thick sheet 3 | 210 | 256 |
| Thick sheet 4 | 257 | 300 |

By transmitting such information to the server 2, the server 2 can analyze, for example, the relationship among the basis weight, fixing heat quantity, and failure from accumulated setting error information of sheet type and failure information, and the like, and can transmit an analysis result to the image forming apparatus 1 to notify the user of the analysis result.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus, comprising:
a first hardware processor that receives setting of a recording medium by a user;
a detector that detects the recording medium;
an image former that forms an image on the recording medium; and
a second hardware processor that transmits, to an external device, at least two pieces of information of setting information of the recording medium received by the first processor, detection information regarding a detection of the recording medium received by the first processor by the detector, or information regarding matching or mismatching of the setting information and the detection information, wherein
the detector performs detection for the recording medium for which setting has not been performed by a user in a first detection mode, and performs detection for the recording medium for which setting has been performed by a user in a second detection mode different from the first detection mode.

2. The image forming apparatus according to claim 1, wherein the second hardware processor transmits a plurality of pieces of information to be transmitted in association with each other.

3. The image forming apparatus according to claim 1, wherein the second hardware processor also transmits failure information generated in the image forming apparatus to the external device.

4. The image forming apparatus according to claim 1, wherein
the second hardware processor further transmits at least one of image information regarding presence or absence of an image on a surface of the recording medium, transmittance information, reflectance information, rigidity information, thickness information, basis weight information, size information, grain direction information, color information, moisture information, smoothness information, resistance information, friction information, configuration information of the recording medium, or print information, and
the configuration information of the recording medium includes at least one of pulp, a coat, a fluorescent agent, a filler, or a coloring material, and the print information includes at least one of a brand of a recording medium, environmental information, sheet feeding port information, or image forming information.

5. The image forming apparatus according to claim 1, further comprising a third hardware processor that determines a type of a recording medium on a basis of a detection result of the detector, wherein
the detector includes an optical sensor that detects transmitted light and/or reflected light of light emitted from a light source to a recording medium as a type determination parameter, and
the third hardware processor determines a type of a recording medium on a basis of the detected transmitted light and/or reflected light, and further calculates at least one of transmittance, reflectance, or basis weight of the recording medium.

6. The image forming apparatus according to claim 1, further comprising:
a receiver that receives failure occurrence information indicating a possibility of occurrence of a failure, the failure occurrence information being analyzed by the external device on a basis of information transmitted from the image forming apparatus by the second hardware processor and accumulated, and transmitted to the image forming apparatus; and
a notifier that notifies a user of the failure occurrence information received by the receiver.

7. The image forming apparatus according to claim 6, further comprising a third hardware processor that determines a type of a recording medium on a basis of a detection result of the detector, wherein the receiver receives an instruction to switch to an image forming condition corresponding to the type determined by the third hardware processor from the external device that has analyzed that there is a possibility of occurrence of a failure.

8. The image forming apparatus according to claim 1, wherein setting of a type of a recording medium by the user is performed by an external print instructor, and the first hardware processor receives the setting performed by the print instructor via a network.

9. The image forming apparatus according to claim 1, wherein a detection time in the second detection mode is shorter than a detection time in the first detection mode.

10. The image forming apparatus according to claim 1, further comprising a third hardware processor that determines a type of a recording medium on a basis of a detection result of the detector, wherein the image former forms an image of the recording medium for which setting of a type has been received by the first hardware processor without reflecting a determination result by the third hardware processor in an image forming process.

11. The image forming apparatus according to claim 1, wherein the first detection mode has higher detection accuracy of the type determination parameter than the second detection mode.

12. The image forming apparatus according to claim 1, wherein a detection range of a type determination parameter for the recording medium by the detector is different between the first detection mode and the second detection mode, and a detection time and a detection accuracy of the first detection mode are equal to or more than a detection time and a detection accuracy of the second detection mode.

13. The image forming apparatus according to claim 12, wherein the second detection mode has a wider detection range than the first detection mode.

14. A type information processing method of a recording medium causing an image forming apparatus to perform:

receiving setting of a recording medium by a user;

detecting, by a detector, the recording medium;

forming an image on the recording medium; and transmitting, to an external device, at least two pieces of information of setting information of the recording medium received, detection information regarding a detection of the received recording medium by the detector, or information regarding matching or mismatching of the setting information and the detection information, wherein the detector performs detection for the recording medium for which setting has not been performed by a user in a first detection mode, and performs detection for the recording medium for which setting has been performed by a user in a second detection mode different from the first detection mode.

15. An image forming apparatus, comprising:

a first hardware processor that receives setting of a recording medium by a user, a detector that detects the recording medium; and an image former that forms an image on the recording medium, wherein the detector performs detection for the recording medium for which setting has not been performed by a user in a first detection mode, and performs detection for the recording medium for which setting has been performed by a user in a second detection mode different from the first detection mode.

* * * * *